United States Patent [19]
Sjölinder et al.

[11] Patent Number: 6,166,331
[45] Date of Patent: Dec. 26, 2000

[54] DEVICE AND METHOD RELATING TO CABLE BRANCHING

[75] Inventors: Sven Sjölinder, Hägersten; Hans Olofsson, Sollentuna; Daniel Edman, Bromma; Lennart Liden, Iggesund; Mikael Tarander, Borlänge, all of Sweden

[73] Assignee: Telefonaktiebolaget LM Ericsson, (publ), Stockholm, Sweden

[21] Appl. No.: 09/180,250

[22] PCT Filed: May 6, 1997

[86] PCT No.: PCT/SE97/00755

§ 371 Date: Nov. 6, 1998

§ 102(e) Date: Nov. 6, 1998

[87] PCT Pub. No.: WO97/42694

PCT Pub. Date: Nov. 13, 1997

[30] Foreign Application Priority Data

May 7, 1996 [SE] Sweden ................... 9601745

[51] Int. Cl.[7] ............................................ H02G 3/00
[52] U.S. Cl. ............................ 174/98; 172/72 R; 172/96; 172/97; 172/95; 172/88 R
[58] Field of Search .................. 174/68.3, 98, 72 R, 174/72 C, 99 R, 136, 71 R, 73.1, 88 R, 95, 96, 97, 101

[56] References Cited

U.S. PATENT DOCUMENTS

| 2,452,823 | 11/1948 | Wright | 174/84 |
| 2,462,993 | 3/1949 | Peters et al. | 173/324 |
| 3,697,670 | 10/1972 | Mitacek | 174/107 |
| 3,875,325 | 4/1975 | Anderson et al. | 174/92 |
| 4,137,424 | 1/1979 | Hesse et al. | 174/97 |
| 4,152,539 | 5/1979 | Charlebois et al. | 174/72 R |
| 4,784,456 | 11/1988 | Smith | 350/96.21 |
| 5,306,870 | 4/1994 | Abat | 174/65 R |

FOREIGN PATENT DOCUMENTS

| 0584600 A1 | 3/1994 | European Pat. Off. |
| 36 30 659A1 | 3/1988 | Germany |

*Primary Examiner*—Kristine Kincaid
*Assistant Examiner*—W. David Walkenhorst
*Attorney, Agent, or Firm*—Burns, Doane, Swecker & Mathis, L.L.P.

[57] ABSTRACT

The present invention relates to the field of arrangements at cable branchings and methods for manufacturing cable branches. One or more main conductors in the main cable are cut and released from the main cable. The cut and released main conductors are spliced with branch conductors extending from and end of a branch cable. A section of the main cable is arranged at a rail. A section of the branch cable, including the end, is also arranged at the rail. The tension reliever of the branch cable is fixed to the rail using a fixing device. A protective casing encloses the rail, the main cable section, the branch cable section, the spliced conductors and the fixing device.

19 Claims, 4 Drawing Sheets

DEVICE AND METHOD RELATING TO CABLE BRANCHING

The present invention relates to the fields of cable branching and methods for the manufacturing of cable branches.

STATE OF THE ART

In some technical applications the need arises to branch main conductors from one main cable to branch conductors in a branch cable.

Such a technical application is found in fibre optic access networks. A multi-fibre cable (the main cable) must pass a number of boxes, so called ONUs (Optical Network Unit) comprising circuitry for approximately 30 subscribers. The ONUs transform the optically transmitted information from the multi-fibre cable to the electrically transmitted (copper cable) information that reaches the subscribers. Thus, for each ONU a cable branch must be arranged. With such a cable branch optical fibres (the main conductors) are branched from the multi-fibre cable to other optical fibres (the branch conductors) in a smaller optical cable (the branch cable) and the smaller optical cable then runs up to the ONU. A maximum of approximately 16 ONUs may be connected to one multi-fibre cable. To avoid high costs for digging when the cables are laid down, it is desirable to be able to determine on site where the cable branches should be placed. Therefore, a reliable and simple form of cable branching, which can also be carried out under field-like conditions is preferred. The alternative is to manufacture the cable branches in a factory in advance, and it is of course difficult to know in advance where the cable branch is best placed, as one cannot know in advance the exact length of the main cable, the digging conditions and the like.

When a cable branch is made, the main conductors to be branched must be cut and in some way released from the main cable, so that they can be spliced with branch conductors belonging to a branch cable. The branch conductors to be spliced with the main conductors are in this situation normally arranged so that they extend a distance from one end of the branch cable, so that more space is achieved for performing the splice. Cable branches also normally comprise different kinds of protection arrangements, against humidity, mechanical strain and the like.

The patent literature contains several examples of cable branches.

In the patent specification EP, A1, 0584600 an example of a cable branch is shown. Two portions, from which the casing has been removed, are arranged on the main cable. At the first of these portions from which the casing has been removed, the main conductors to be branched have been cut and then pulled out at the other portion from which the casing has been removed, and have thus been released from the main cable. These main conductors are spliced with branch conductors extending from the ends of, in this case, two branch conductors. The splices are placed in mechanical protection arrangements. The ends of the cable casing on both sides of the other portion from which the casing has been removed are mechanically connected by means of a beam, and the ends of the two branch conductors are also mechanically connected to the beam. A housing is arranged around the second portion from which the casing has been removed, the beam, the spliced conductors and the branch cable ends. The ends on both sides of the first portion from which the casing has been removed have been connected to a beam and a housing has been arranged also around this portion from which the casing has been removed.

This cable branching has disadvantages. Double sets of beams and housings are needed and therefore also double work. The housing must be manufactured specially and each housing only fits cables of a specific size.

In the patent specification DE, A1, 363 an example of a cable branch is shown. A portion from which the casing has been removed is arranged at the main cable. The portion from which the casing has been removed is arranged in a stretched-out state in a housing. The main conductors have been cut at the portion from which the casing has been removed and thus even been released from the main cable. The cut main conductors have been spliced with branch conductors extending from the end of a branch cable. The branch cable end is fastened to the housing. The splices are arranged in a mechanical protector.

This cable branching has disadvantages. If a length of cable which is feasible to work with is desired when performing the splice, the portion from which the casing has been removed must be quite long, which results in a big housing. The housing must be manufactured specially and only fits cables of a specific size.

In the patent specification DE, A1, 363 another example of a cable branch is also shown. A portion from which the casing has been removed is arranged at the main cable, and a circular cut is made through the cable casing, at a distance from the portion from which the casing has been removed. In this way a movable piece of the casing is arranged between the portion from which the casing has been removed and the circular cut. If the movable piece of casing is moved in the direction towards the portion from which the casing has been removed an opening appears at the circular cut. In this opening the main conductors to be branched are cut. The movable piece of casing is moved back and the main conductors to be branched are pulled out at the portion from which the casing has been removed, so that the main conductors to be branched are released from the main cable. The cut main conductors are spliced to branch conductors extending from the end of a branch cable. The splices are placed in a mechanical protector. The portion from which the casing has been removed is placed in a stretched-out state in a housing and another housing is arranged around the circular cut.

This cable branching has disadvantages. Two housings are required, and thus double work. The housings must be manufactured specially and each housing only fits a specific cable size.

SUMMARY OF THE INVENTION

The object of the present invention is to solve the following problems: firstly to achieve a cable branch where a number of main conductors in a main cable are branched to a number of branch conductors in a branch cable; secondly to ensure that the cable branching is easy to perform and requires few complicated or specially manufactured parts and thirdly to ensure that the cable branching can easily be carried out under field-like conditions.

The problems stated above are generally solved as follows: A piece of the main cable is mounted on a rail, the purpose of which is to mechanically relieve and provide a certain amount of protection to the cable branch. The ends of a number of branch conductors which have been arranged so that they extend a distance past one end of a branch cable, are spliced to the ends of a number of main conductors which have been cut and released from the main cable. One portion of the branch cable, comprising the end of the branch cable, is mounted on the rail. In the case when the branch cable comprises a tension reliefin part it is suggested according to the invention that the tension reliefing part be fixed at the rail by means of a fixing device, for example a locking screw. According to the invention it is also proposed that the fixing device may be moved along the rail, thus providing possibility of redoing the splice between the main conductors and the branch conductors—if the splice should have failed in any way—since the branch cable may then be moved far enough to provide sufficient slack in the spliced conductors for the old splices to be removable so that new ones may be made. Finally a tight-fitting protective casing is mounted around the rail, the spliced conductors and the portions of the main cable and the branch cable which have been mounted at the rail.

More concretely, the above stated problems are solved as follows: The rail in this situation is comprised of an elongated metal plate, which has been bent so that two edges have been formed on the upper side of the plate. The cable casing is removed along a portion of the cable and a circular cut is made in the cable casing. In this way a movable portion of the cable casing is created, which may be moved back and forth between the place where the circular cut through the cable casing was made and the portion from which the casing has been removed. By moving the movable portion of the cable casing towards the portion from which the casing has been removed a small opening occurs at the place where the circular cut through cable casing was made. In the opening the main conductors to be branched are identified and cut. The cut main conductors are pulled out at the portion from which the casing has been removed, and the movable portion of the cable casing is moved back towards the place where the circular cut was made through the cable casing. This frees the main conductors from the main cable and they are spliced with the branch conductors of the branch cable. The portion of the main cable to be mounted at the rail is arranged so that it lies close against the plate and one of the edges. The main cable is fixed to the rail by means of fixing means, for example lockable metal strips. The portion of the branch cable to be mounted on the rail is arranged so that is lies close against the plate and the other edge. The branch cable is fixed to the rail by means of fixing means in a similar way as the main cable. According to the invention it is proposed to arrange the protective casing according to the following. A wrapping which is relatively stable in shape is mounted around the rail, the cable portions mounted on the rail and the spliced conductors. The outside of the wrapping is preferably smooth. Adhesive tape is then wound around the wrapping with the adhesive side out. A watertight cloth is arranged around the tape-wound wrapping. The cloth may for example be made from self-vulcanizing rubber cloth. Around the cloth, adhesive tape is wound; this time with the adhesive side turned inwards.

In addition to solving the problems stated above, the invention has the following advantages. Firstly it provides a cable branch which may be made at a relatively low cost. Secondly, exactly the same parts may be used for branching cables of somewhat varying size.

The invention will now be described in more detail by means of preferred embodiments and with reference to the enclosed drawings.

DESCRIPTION OF PREFERRED EMBODIMENTS

Figure 1:
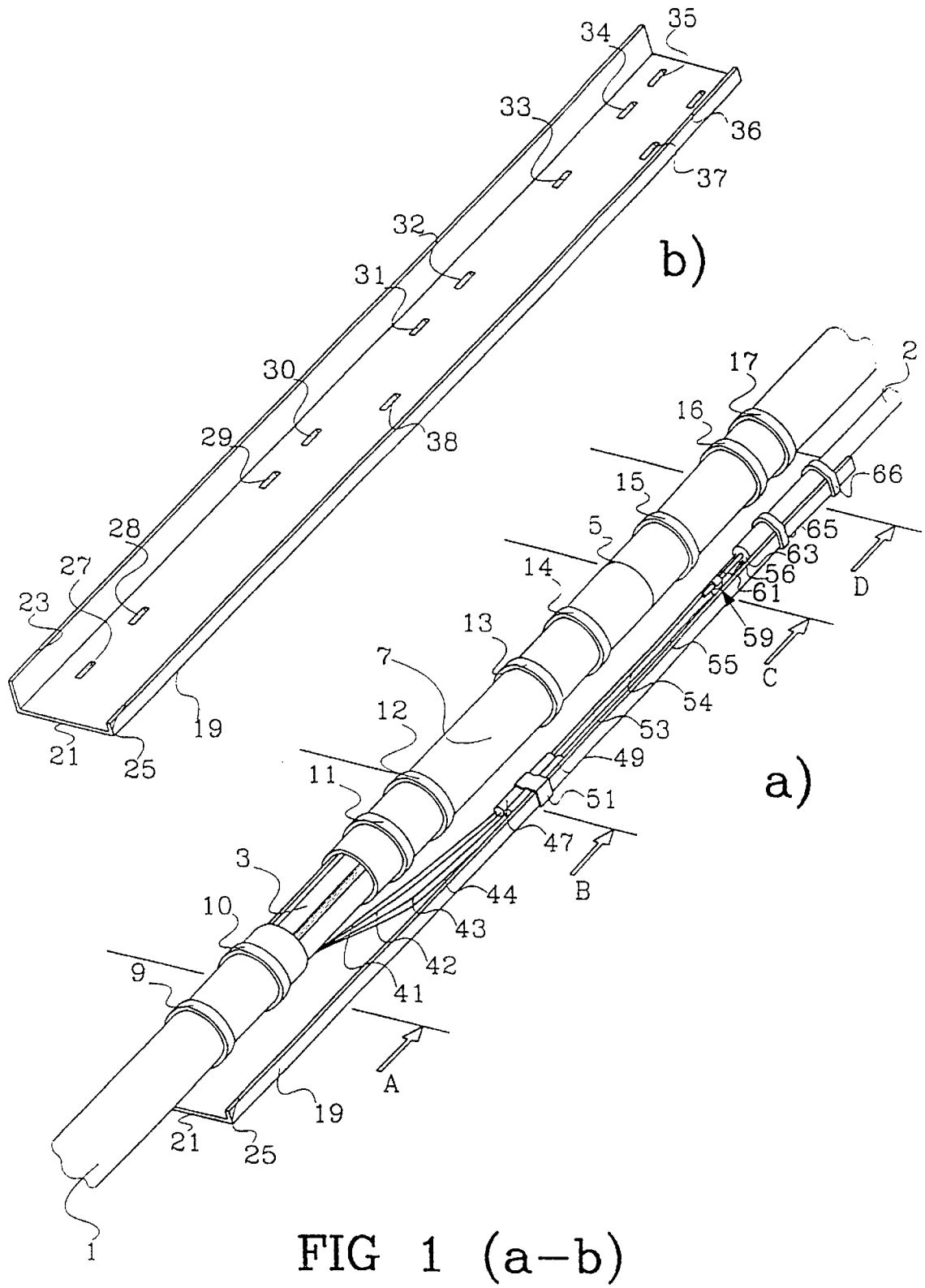
FIG. 1a is a perspective view of a cable branch according to the invention.
FIG. 1b a perspective view of a detail of a cable branch according to the invention.
Figure 3:
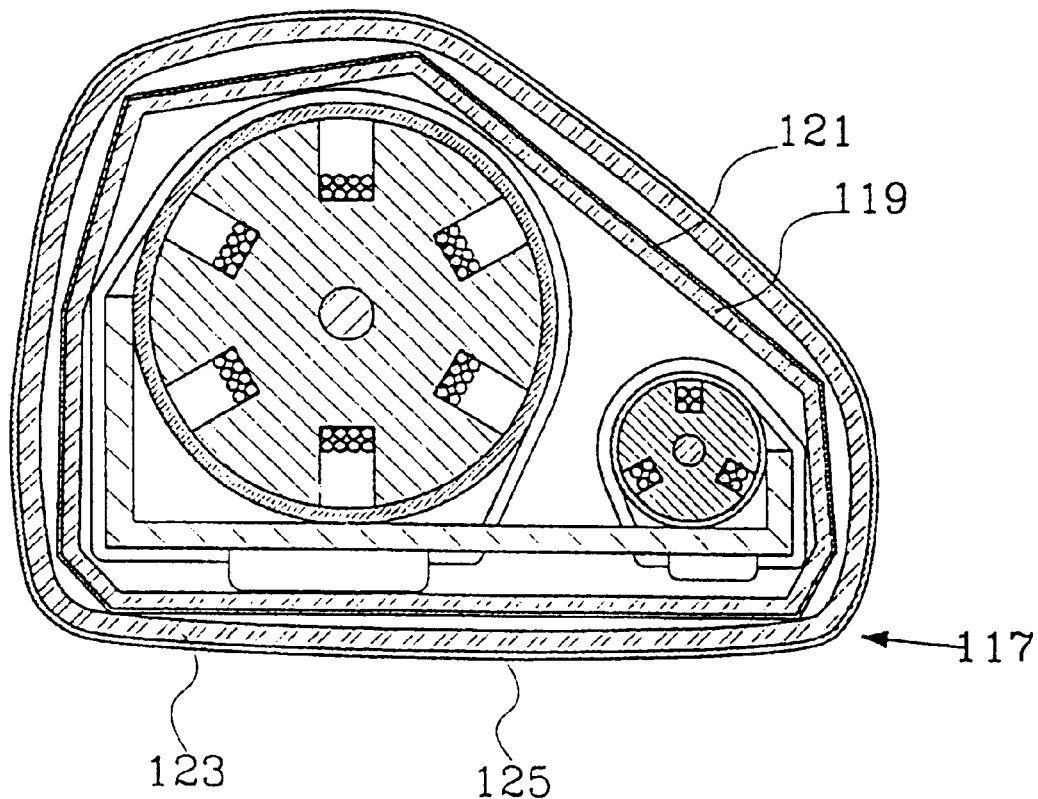
FIG. 3 is a cross-section of a cable branch according to the invention.

In FIG. 1a it is shown how a possible cable branch according to the invention looks before the protective casing 117, 95 shown in FIG. 3 has been mounted around the cable branch.

A portion 3 from which the casing has been removed is arranged in a main cable 1, and at a distance form the portion from which the casing has been removed a circular cut 5 is also made in the cable casing. The portion 7 of the cable casing between the portion 3 from which the casing has been removed and the circular cut 5 thus is movable along the cable 1. If the movable portion 7 is moved in the direction towards the portion 3 from which the casing has been removed an opening occurs at the point where the circular cut 5 was made. In this opening the main conductors 41–44 to be branched have been identified and cut. After the main conductors were cut, the movable portion 7 was moved back, so that the opening was closed. The cut main conductors 41–44 have then been pulled out at the portion 3 from which the casing was removed and in this way the main conductor ends to be spliced with branch conductors 53–56 in a branch cable 2 are released from the main cable.

In FIG. 1a a section of the main cable is arranged on a rail 19. This main cable section extends substantially lengthwise to the rail and comprises both the portion 3 from which the casing has been removed and the circular cut 5. The main cable section is fixed to the rail by a number of fixing means 9–17 which in the embodiment of the invention shown in FIG. 1a consist of lockable metal strips 9–17. In FIG. 1a the main cable section is fixed with nine metal strips 9–17, but it is of course not necessary to use this exact number. It is however feasible to place one or a few metal strips at both ends of the rail. It may also be feasible to place one or a few metal strips at the movable portion of the cable casing.

The rail 19 which is shown on its own in FIG. 1b is in the embodiment shown made from an elongated rectangular plate 21. The plate has been bent so that a first 23 and a second 25 edge have been formed on the upper side of the plate, and these edges 23 and 25 extend in the longitudinal direction of the rail 19. Through recesses 27–38 and 115 are arranged in the plate 21, between the edges 23 and 25.

The cut main conductors 41–44 in FIG. 1a have been spliced with branch conductors 53–56 which extend from the end 63 of a branch cable 2. In the embodiment shown in FIG. 1a the conductors 41–44 and 53–56 are optical fibres. The splicing of optical fibres often takes place with filsing, which is a method well known to the person skilled in the art, and the fused joints are normally enclosed in mechanical protectors 47 and 49, so called splice protection sleeves. Such splice protection sleeves are commercially available and a known manufacturer is Raychem Corporation. In FIG.

1a the fused joints have been placed in two splice protection slesves 47 and 49 and the splice protection sleeves are fixed to the rail by means of a spring clip 51.

In FIG. 1a a section of the branch cable 2 is arranged to lie close to the plate 21 and the second edge 25. This branch cable section comprises a branch cable end 63 and is fixed to the rail by means of fixing means 65 and 66 which in the shown embodiment consist of lockable metal strips 65 and 66 which in the exemplary embodiment comprise lockable metal strips.

The branch conductors 53–56 comprised in the branch cable, which have been spliced with the cut main conductors 41–44 have not been cut at the branch cable end 63, but extend a distance from the branch cable end. This distance has been chosen so that fibre lengths which are feasible to work with during fusing are obtained. The branch cable 2 in FIG. 1a comprises a centrally located tension relief means 61. The tension relief means 61 is not cut at the branch cable end 63 but extends a distance from the branch cable end. This extending portion of the tension relief means 61 is fixed to the rail 19 by means of a fixing device 59, which in one exemplary embodiment is comprised of a locking screw arrangement.

Figure 2:
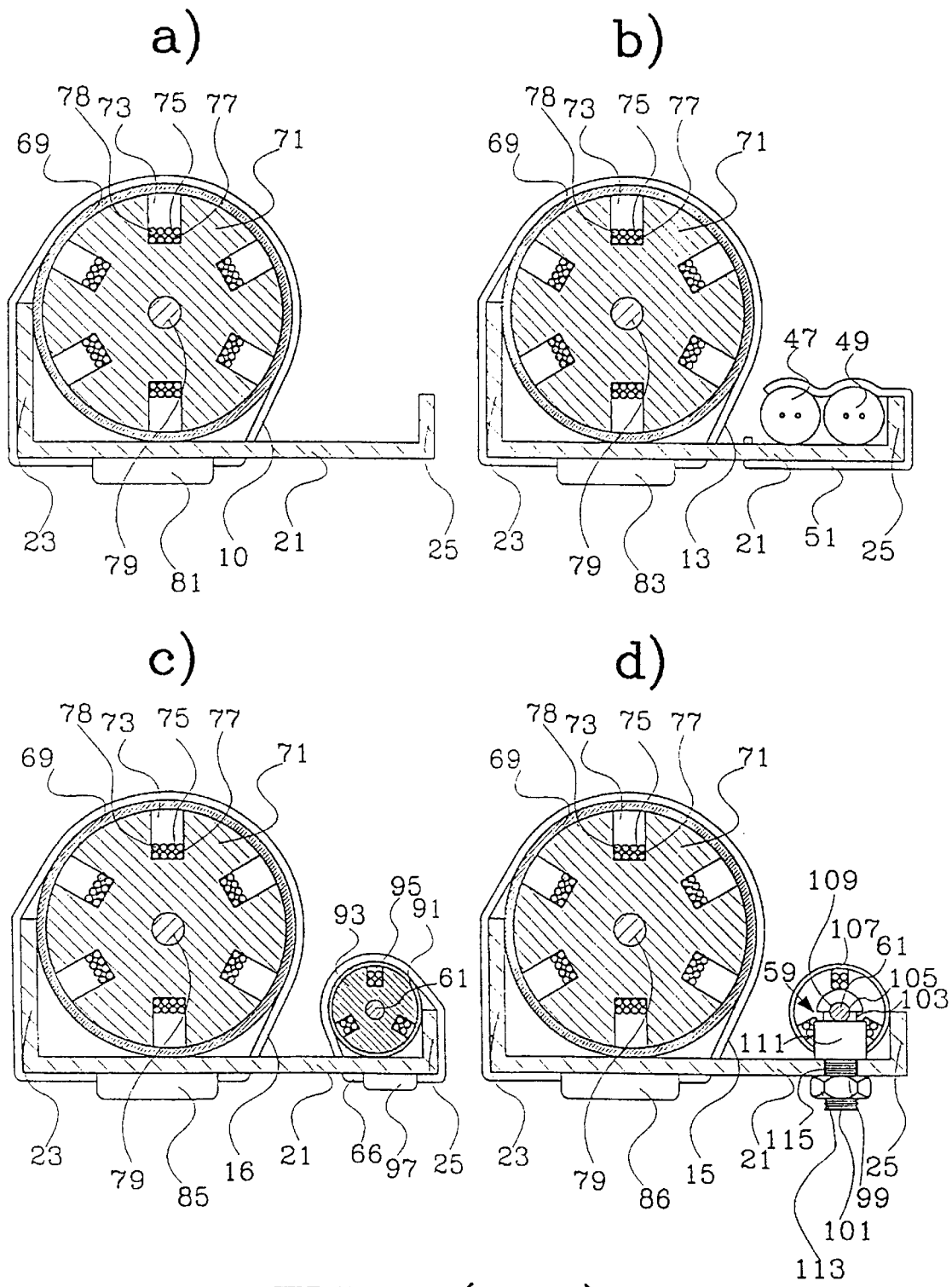
FIG. 2a is a cross-section of a cable branch according to the invention.
FIG. 2b is a cross-section of a cable branch according to the invention.
FIG. 2c is a cross-section of a cable branch according to the invention.
FIG. 2d is a cross-section of a cable branch according to the invention.

In FIG. 2(a–d) four cross-sections of the cable branching in FIG. 1a are shown.

FIG. 2a shows the cross-section labelled A in FIG. 1a. Here the main cable 1 can be seen in cross-section. The main cable 1 in the embodiment shown here is a slotted core cable. Within the cable casing 69 there is a core 71—normally manufactured in a plastic material—in which six grooves 73 are arranged in the longitudinal direction of the cable 1. In each groove 73 there are two so called ribs 77 and 75 which in turn comprise four optical fibres 78 each. The ribs 77 and 75 and the optical fibres are colour marked in such a way that an identification of the single fibres is possible. The main cable 1 in the figure also comprises a centrally located tension reliever 79.

FIG. 2a also shows in detail how one of the metal strips 10 is arranged to fix the main cable 1 to the rail 19. The metal strip 10 here first runs on the lower side of the plate 21 and then around the first edge 23 and part of the circumference of the cable, to finally return through one of the recesses 28 to the lower side, where the metal strip 10 is locked with a locking arrangement 81. The metal strip 10 in this way forms a loop surrounding the main cable 1 and keeps this lying close to the rail 19. Lockable metal strips are commercially available, for example Panduit MLT 2S/CP or the like.

FIG. 2b shows the cross-section labelled B in FIG. 1a. The figure shows how the two splice protection sleeves 47 and 49 are fixed to the rail 19 by a spring clip 51 which in the figure is made up of a bent metal strip 51. The metal strip 51 is fixed in one of the recesses 38 and runs first on the lower side of the plate 21 and then around the second edge 25, to finally lie close to the upper sides of the splice protection sleeves 47 and 49 and in this way press the splice protection sleeves against the upper side of the plate. Where the metal plate 51 lies close against the splice protection sleeves 47 and 49, it has been given a somewhat bent shape, so that it firmly grasps the splice protection sleeves.

FIG. 2c shows the cross-section labelled a D in FIG. 1a. Here the branch cable 2 can be seen in cross-section. The branch cable 2 is also, in the embodiment shown here, a slotted core cable. The branch cable 2 in FIG. 2c comprises inside its cable plate 91 a core 93 with three grooves 95. In each groove four optical fibres run. The branch cable 2 lies in contact with the plate 21 and the second edge 25 and is fixed to the rail 19 in a similar way as the main cable 1, by means of two fixing elements 65 and 66 in the form of lockable metal strips 65 and 66. In the figure the tension reliever 61 centrally located in the branch cable 2 can be seen.

FIG. 2d shows the cross-section labelled C in FIG. 1a. The way in which the tension reliever 61 of the branch cable 2 is fixed to the rail 19 is shown in detail in this Figure.

The tension reliever 61 is here fixed with a locking screw arrangement 59 comprising a screw 99, a washer 111 and a nut 113.

The screw comprises a first 101 and a second 103 end. Threads are arranged at the first 101 end of the screw and these extend a certain distance along the screw 99. A through hole 105, of circular cross-section, is arranged in the screw 99 at the second end 103 of the screw. The hole 105 is arranged in such a way that the hole penetrates the screw 99 substantially transverse to the longitudinal direction of the screw. At the second end 103 of the screw 99 an extended portion 107 is also arranged, in such a way that the longitudinal direction of the extending portion is substantially transverse to the longitudinal direction of the screw. The extending portion 107 comprises a groove 109, of semicircular cross-section, extending in the longitudinal direction of the extending portion. The groove 109 is here arranged so that the half of the wall of the hole extending through the screw 99 located farthest from the first end 101 of the screw is comprised by a part of the extension of the groove.

The washer 111 is a metal washer 111 with a circular through hole, the diameter of this hole exceeding the diameter of the screw 99.

The nut 113 is a hexagonal nut, which fits the threads of the screw 99.

The locking screw arrangement 59 fixes the tension reliever 61 of the branch cable 2 according to the following. The washer 111 lies close against the upper side of the plate 21 in such a way that the hole in the washer is aligned with one of the holes 115 in the plate. This hole 115 is hidden by the second edge 25 in FIGS. 1a and 1b, but is shown in FIG. 2d. The tension reliever 61 in the branch cable 2 is slipped through the. hole 105 in the screw 99, and the screw passes through the hole in the washer 111 and continues through the hole 115 so that its first end 101 comes out on the lower side of the plate 21. The nut 113 is screwed onto the screw 99 on the lower side of the plate 21. The screw 99 is arranged so that the longitudinal direction of the extending portion 107 substantially coincides with the longitudinal direction of the rail 19. The tension reliever 61 is squeezed between the groove 109 in the extending portion 107 and the washer 111 and when the nut is tightened the tension reliever is therefore fixed to the locking screw arrangement. The rail is squeezed between the nut 113 and the washer 111 and when the nut 113 is tightened the locking screw arrangement 59 is therefore fixed to the rail 19, whereby the tension reliever 61 will of course also be fixed to the rail.

The recess 115 through which the screw 99 goes, extends in the longitudinal direction of the rail. If the nut 113 is loosened, the locking screw arrangement 59 can therefore be moved in the longitudinal direction of the rail 19. This is advantageous if the splices between the conductors 41–44 and 53–56 have failed in any way, as the locking screw arrangement 59 and the branch cable 2 may then be moved a bit forward so that enough slack is obtained in the spliced conductors to make it possible to remove the failed splices and make new ones.

Until now the cable branch has been shown without the protective casing 117 which according to the invention is suitably included in the cable branch. Of course a cable branch according to the invention may be used also without a protective casing—if for some reason it should be considered unnecessary to have one. In FIG. 3 a cross-section of the cable branch is shown in which the protective casing 117 is included. The position of the cross section corresponds approximately to the position of the cross section labelled D in FIG. 1a.

The protective casing 117 comprises a wrapping 119 which is relatively stable in shape, arranged so that it encloses the rail 19, the main cable section, the branch cable section, the spliced conductors 41–44 and 53–56 and the locking screw arrangement 59. The wrapping 119 has a cylindrical, prismatic or other similar elongated shape, and the longitudinal direction of this shape substantially coincides with the longitudinal direction of the rail 19. In the embodiment shown in the figure the shape is substantially prismatic. The side of the wrapping facing outwards as a suggestion is smooth. In the embodiment shown in FIG. 3 the wrapping 119 is made of a folded sheet of paper and the smooth side is made up of an aluminium film arranged on the paper sheet. Paper sheets of this kind are commercially available, for example of the kind Nitto NTS or the like. Adhesive tape 121 is arranged around the wrapping 119 and the adhesive tape here is arranged with the adhesive side facing way from the wrapping.

The tape-wound wrapping 119 is enclosed in a watertight cloth 123. In the embodiment shown in FIG. 3 the cloth is made up of a self-vulcanizing rubber cloth 123. Such rubber cloths are commercially available, for example of the kind Nitto G057 or the like. Around the cloth adhesive tape 125 is arranged, this time with the adhesive side facing the cloth.

Figure 4:
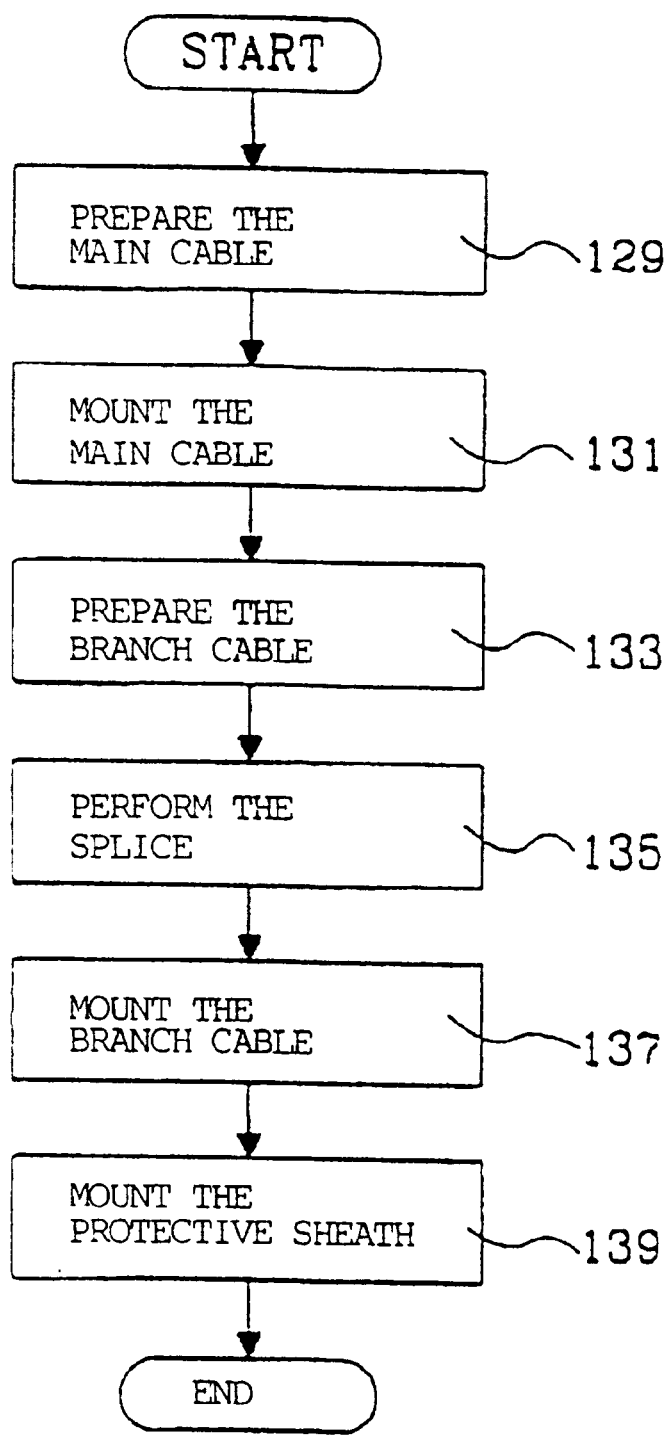
FIG. 4 is a flow chart of a method for making a cable branch according to the invention.

The method of manufacturing a cable branch according to the invention is simple and precise and will be described here, with reference to the flow chart in FIG. 4.

The method starts 129 with the main cable 1 being prepared. A portion 3 from which the casing has been removed is arranged in the main cable 1. The length of the portion 3 from which the casing has been removed is suitably between five and fifteen centimetres long. A circular cut 5 is arranged in the cable casing 69, whereby a movable piece 7 of the casing is formed between the circular cut and the portion 3 from which the casing has been removed. The distance between the portion 3 from which the casing has been removed and the circular cut 5 is suitably between 50 and 90 centimeters. The movable piece 7 of casing is moved in the direction towards the portion 3 from which the casing has been removed, so that an opening is formed at the place where the circular cut 5 was made. In the opening the main conductors 41–44 to be branched are identified and cut. The movable piece 7 of casing is moved back so that the opening is closed, and the main conductors 41–44 to be branched are identified and pulled out at the portion from which the casing has been removed.

The method continues 131 with the main cable 1 being mounted on the rail 19. The main cable 1 is placed so that it lies close against the plate 21 and the first edge 23 and fixed with the metal strips 9–17. The main cable 1 in this step is laid so that the portion 3 from which the casing has been removed and the circular cut 5 are located between the first and the second end of the rail 19. The main cable 1 should preferably be placed so that the main conductors 41–44 to be branched are substantially located on the same level as the rail 19.

The method continues 133 with the branch cable 2 being prepared. The branch cable 2 is cut so that a branch cable end 63 is formed. The branch conductors 53–56 to be spliced with the main conductors 41–44 to be branched and the centrally located tension reliever 61 of the branch cable 2 are however not cut at the end 63 of the branch cable but are arranged so that they extend suitable distances from the branch cable end.

The method continues 135 with the splice being made. The conductors to be spliced—that is the main conductors 41–44 to be branched and the branch conductors 53–56 extending from the branch cable end 63—are cut—if necessary, to suitable lengths. The conductors 41–44 and 53–56 are spliced and the mechanical protectors 47 and 49 (the splice protection sleeves) are applied around the joints.

The method continues 137 with the branch cable being mounted. A section of the branch cable, comprising the branch cable end 63, is arranged at the rail 19 so that it lies close to the plate 21 and the second edge 25. It is hereby ensured that the spliced conductors 41–44 and 53–56 are stretched to a suitable extent. The branch cable 2 is locked to the rail 19 with at least two metal strips 65 and 66, and the mechanical protection arrangements 47 and 49 are fixed to the rail 19 by means of the spring clip 51. The tension reliever 61 of the branch cable 2 is fixed to the rail by means of the locking screw arrangement 59.

The method is ended 139 with the protective casing being mounted. The wrapping 119 is folded around the rail 19, the cable sections arranged at the rail, the spliced conductors 41–44 and 53–56 and the locking screw arrangement 59 in such a way that it is given a cylindrical, prismatic or other similar elongated shape, whereby the longitudinal direction of this shape is made to substantially coincide with the longitudinal direction of the rail. Adhesive tape 121 is wound from the middle of the wrapping 119 to one end of the wrapping. Then the adhesive tape 121 is wound to the other end and back to the middle, whereby two layers of adhesive tape are arranged around the wrapping 119. In this procedure the adhesive tape 121 is wound with the adhesive side facing away from the wrapping 119, to facilitate a possible reopening of the splices. The self-vulcanizing rubber cloth 123 is wound once around the tape-wound wrapping 119. Finally two layers of adhesive tape 125 are wound around the cloth 123 in a similar way as around the wrapping 119, but this time with the adhesive side facing the cloth.

In the above, the main conductors in the main cable have been branched to one branch cable. Of course it is possible to branch the main conductors to branch conductors belonging to several different branch cables. These branch cables may then be prepared and mounted on the rail in a similar way as the branch cable in the embodiments described above.

What is claimed is:

1. A cable branching system comprising a main cable, in turn comprising at least one main conductor, at least one branch cable, in turn comprising a branch cable end (63) and at least one branch conductor and at least one splice, arranged to splice the end of the at least one branch conductor extending from the branch cable end, wherein the cable branching comprises a substantially stretch and bend resistant rail, in turn comprising a first and a second end, that a section of the main cable substantially coincides with the longitudinal direction of the rail, that a branch cable section, including the branch cable end, is arranged on the rail, whereby the longitudinal direction of the branch cable section substantially coincides with the longitudinal direction of the rail, and that a protective casing is arranged to enclose the rail, the main cable section, the branch cable section and the spliced conductors.

2. The cable branching system according to claim 1, wherein the main cable comprises a cable casing whereby the at least one main conductors are arranged inside the cable casing, that a portion from which the casing has been removed is arranged in the main cable, that a circular cut is made in the cable casing has been removed and the circular cut, and that the cut main conductors have been cut at the circular cut and pulled out at the portion from which the casing has been removed.

3. The cable branching system according to claim 2, wherein the branch cable end faces the portion from which the casing has been removed, that the branch cable end is positioned between the portion from which the casing has been removed and one predetermined end of the two ends of the rail, and that the circular cut is arranged closer to the predetermined end than the portion from which the casing has been removed.

4. The cable branching system according to claim 2, wherein the protective casing comprises a relatively shape-stable wrapping, arranged to enclose the rail, the main cable section, the branch cable section and the spliced conductors, that the wrapping is arranged to assume a substantially cylindrical shape, whereby the longitudinal direction of the cylindrical shape substantially coincides with the longitudinal direction of the rail, that the side of the wrapping facing out is smooth, that at least one layer of adhesive tape is arranged around the wrapping, whereby the tape is arranged with the adhesive side away from the wrapping, that the protective casing comprises a watertight cloth arranged to tightly enclose the tape-wound wrapping, and that at least one layer of adhesive tape is arranged around the cloth, whereby this adhesive tape is arranged with the adhesive side facing the cloth.

5. The cable branching system according to claim 4, wherein the wrapping is made up of a paper sheet, whereby the smooth side of the wrapping facing out is made up of an aluminum film arranged on the paper sheet.

6. The cable branching system according to claim 4, wherein the cloth is made up of a self-vulcanizing rubber cloth.

7. The cable branching system according to claim 1 wherein the rail comprises an elongated plate, that the plate comprises a first and a second edge arranged on one side of the plate, whereby the edges extend substantially in the longitudinal direction of the rail, that the main cable section and the branch cable section are arranged between the first edge and the second edge, that the main cable section is arranged to lie in contact with both the plate and the first edge, that the branch cable section is arranged to lie in contact with the plate and the second edge.

8. The cable branching system according to claim 7, wherein the main cable section is arranged on the rail by means of lockable strips, that at least one lockable strip is arranged substantially at the first end of the rail and that at least one lockable strip is arranged substantially at the other end of the rail.

9. The cable branching system according to claim 7, wherein the branch cable section is arranged at the rail by means of at least two lockable strips.

10. The cable branching system according to claim 1, wherein the branch cable comprises a tension relieving part (61), that the cable branching comprises a fixing arrangement (59), arranged to fix the tension relieving part to the rail, and that the protective casing is arranged to enclose the fixing arrangement too.

11. The cable branching system according to claim 10, wherein the fixing arrangement is movable in the longitudinal direction of the rail.

12. The cable according to claim 1 wherein at least one mechanical protection device is arranged to protect at least one of the splices, and that at least one spring clip is arranged to fix the mechanical protection devices to the rail.

13. A method for manufacturing a cable branching, wherein cutting at least one main conductor and releasing it from a main cable (1), arranging a main cable section at a stretch and bend resistant rail (19) comprising a first and a second end, in such a way that the longitudinal direction of the main cable section is made to substantially coincide with the longitudinal direction of the rail, arranging branch cable end at a branch cable whereby at least one branch conductor is arranged to extend a predetermined distance from the branch cable end, arranging at lest one splice as to splice one of the at least one branch conductors extending from the branch cable end, and arranging a branch cable section comprising the branch cable end at the rail in such a way that the longitudinal direction of the branch cable section is made to substantially coincide with the longitudinal direction of the rail.

14. The method according to claim 13, wherein arranging a protective casing to enclose the rail, the main cable section, the branch cable section and the spliced conductors.

15. A cable branching system comprising:

a main cable having at least one main conductor;

at least one branch cable, having at least one branch conductor, which communicates with the main cable;

a rail which supports the main cable section and the at least one branch cable in the longitudinal direction; and a protective casing arranged to enclose the rail, the main cable and the at least one branch cable.

16. The cable branching system of claim 15, wherein the at least one branch cable includes at least one splice.

17. The cable branching system of claim 15, wherein the main cable comprises a cable casing whereby the at least one main conductors are arranged inside the cable casing, the cable casing has a removed portion and remaining portion, wherein the remaining portion is able to move along the longitudinal direction due to a circular cut in the cable casing.

18. The cable branching system of claim 15, further including at least one lockable strip.

19. The cable branching system of claim 15, wherein the at least one lockable strip encloses the rail.

* * * * *